United States Patent
Hwu et al.

(10) Patent No.: US 8,266,413 B2
(45) Date of Patent: Sep. 11, 2012

(54) PROCESSOR ARCHITECTURE FOR MULTIPASS PROCESSING OF INSTRUCTIONS DOWNSTREAM OF A STALLED INSTRUCTION

(75) Inventors: Wen-Mel W. Hwu, Champaign, IL (US); Ronald Barnes, South Riding, VA (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 814 days.

(21) Appl. No.: 11/724,034

(22) Filed: Mar. 14, 2007

(65) Prior Publication Data
US 2008/0028183 A1    Jan. 31, 2008

Related U.S. Application Data

(60) Provisional application No. 60/782,160, filed on Mar. 14, 2006.

(51) Int. Cl.
*G06F 9/30* (2006.01)
(52) U.S. Cl. ......................... 712/229; 712/219
(58) Field of Classification Search .................. 712/216, 712/218, 219, 225, 229
See application file for complete search history.

(56) References Cited

U.S. PATENT DOCUMENTS

| | | | |
|---|---|---|---|
| 5,611,063 A | 3/1997 | Loper et al. | |
| 5,754,812 A | 5/1998 | Favor et al. | |
| 5,805,470 A | 9/1998 | Averill | |
| 5,845,103 A * | 12/1998 | Sodani et al. | 712/216 |
| 5,881,280 A | 3/1999 | Gupta et al. | |
| 5,903,749 A | 5/1999 | Kenner et al. | |
| 5,933,618 A | 8/1999 | Tran et al. | |
| 5,940,622 A | 8/1999 | Patel | |
| 6,098,166 A * | 8/2000 | Leibholz et al. | 712/216 |
| 6,175,956 B1 | 1/2001 | Hicks et al. | |
| 6,189,088 B1 | 2/2001 | Gschwind | |
| 6,269,477 B1 | 7/2001 | Fitzgerald et al. | |
| 6,272,619 B1 | 8/2001 | Nguyen et al. | |
| 6,308,322 B1 | 10/2001 | Serocki et al. | |
| 6,321,328 B1 | 11/2001 | Karp et al. | |
| 6,321,378 B1 | 11/2001 | Weber | |
| 6,415,380 B1 | 7/2002 | Sato | |
| 6,564,372 B1 | 5/2003 | Babaian et al. | |

(Continued)

FOREIGN PATENT DOCUMENTS
EP     1 150 202 A2    10/2001

OTHER PUBLICATIONS

Barnes et al., "Beating In-Order Stalls with 'Flea-Flicker' Two-Pass Pipelining", IEEE, 2003, 12 pages.*

(Continued)

*Primary Examiner* — David Huisman
(74) *Attorney, Agent, or Firm* — Krieg DeVault LLP

(57) ABSTRACT

A processor triggers a first advanced execution processing pass to an instruction sequence in response to a first stalled instruction and initiates execution of a further instruction in the instruction sequence that stalls during the performance of the first advanced execution processing pass. A second advanced execution pass is performed through the instruction sequence in which the further instruction is processed again to provide a valid result after stalling. In one form, the first instruction is performed while the processor operates in a normal execution mode and the first and second advanced execution processing passes are performed while the processor operates in an advance execution mode.

14 Claims, 10 Drawing Sheets

U.S. PATENT DOCUMENTS

| | | | |
|---|---|---|---|
| 6,594,734 B1 | 7/2003 | Kyker et al. | |
| 6,647,485 B2 | 11/2003 | Nguyen et al. | |
| 6,725,333 B1 | 4/2004 | Degenaro et al. | |
| 6,851,110 B2 | 2/2005 | Hundt et al. | |
| 6,877,086 B1* | 4/2005 | Boggs et al. | 712/218 |
| 6,948,160 B2 | 9/2005 | Click et al. | |
| 6,970,988 B1 | 11/2005 | Chung | |
| 7,213,133 B2* | 5/2007 | Caprioli et al. | 712/228 |
| 2004/0168045 A1 | 8/2004 | Morris et al. | |
| 2005/0138332 A1* | 6/2005 | Kottapalli et al. | 712/218 |

OTHER PUBLICATIONS

Mutlu et al., "On Reusing the Results of Pre-Executed Instructions in a Runahead Execution Processor", IEEE, Jan. 2005, 4 pages.*

Mutlu et al., "Techniques for Efficient Processing in Runahead Execution Engines", IEEE, Jun. 2005, 12 pages.*

Ronald D. Barnes, et al.; Tolerating Cache-Miss Latency with Multipass Pipelines; Jan.-Feb. 2006; pp. 40-47; IEEE Computer Society.

Ronald D. Barnes, et al.; "Flea-flicker"Multipass Pipelining: An Alternative to the High-Power Out-of-Order Offense; Nov. 2005; IEEE Computer Society.

James Dundas, et al.; Improving Data Cache Performance by Pre-executing Instructions Under a Cache Miss; Jul. 1997; Proc. 1997 ACM Int. Conf. on Supercomputing.

Srinivasan, et al.; Continual Flow Pipelines; Oct. 9-13, 2004; pp. 107-119; ASPLOS '04.

Mutlu, et al.; Runahead Execution: An Alternative to Very Large Instruction Windows for Out-of-order Processors; 2003.

Dundas, et al.; Improving Processor Performance by Dynamically Pre-Processing the Instruction Stream; 1998; 246 pgs.; USA.

* cited by examiner

PROCESSOR ARCHITECTURE FOR MULTIPASS PROCESSING OF INSTRUCTIONS DOWNSTREAM OF A STALLED INSTRUCTION

CROSS-REFERENCE TO RELATED APPLICATIONS

The present application claims the benefit of U.S. Provisional Patent Application No. 60/782,160 filed on 14 Mar. 2006, which is hereby incorporated by reference in its entirety.

FEDERALLY SPONSORED RESEARCH OR DEVELOPMENT

The present invention was made with Government assistance under NSF Grant Contract Number CCR0086096. The Government has certain rights in this invention.

BACKGROUND

The present invention relates to computing devices and techniques, and more specifically, but not exclusively, relates to processor architecture for multipass processing of instructions downstream of an instruction that has stalled during normal execution.

As microprocessor designs become increasingly power- and complexity-conscious, future microarchitectures often seek to decrease their reliance on expensive dynamic scheduling structures. While compilers have generally proven adept at planning useful static instruction-level parallelism, relying solely on the compiler's instruction execution arrangement performs poorly when cache misses occur, because variable latency is usually not well tolerated.

Out-of-order execution is a common strategy that allows the processor to determine how to efficiently order instruction execution. Under this model, the cost of long latency operations can be hidden by the concurrent execution of other instructions. Furthermore, because this selection is dynamic, the ordering of instruction execution can adapt to run-time conditions. With this adaptation ability, out-of-order execution is often used in high-performance microprocessors and frequently improves performance in situations with data cache misses. However, the out-of-order execution mechanisms often replicate, at great expense, much work which can be done effectively at compile time. While aggressive register renaming, a component of out-of-order techniques, eliminates output-and anti-dependences that restrict the motion of instructions, this approach may duplicate much of the effort of compile-time register allocation. Dynamic scheduling typically relies on complex scheduling queues and large instruction windows to find ready instructions, and, in choosing the order of instruction execution, repeats the work of the compile-time scheduler. These mechanisms often incur significant power consumption and add instruction pipeline complexity.

In contrast, a static, in-order execution strategy usually does not incur this expense. Such an approach executes instructions according to the specified compiler plan of execution. While compilers can be successful at planning useful static instruction-level parallelism (ILP) for in-order microarchitectures, the efficient accommodation of unanticipable latencies, like those of memory load instructions, remains a vexing problem. Accordingly, there is further need for contributions to this area of technology.

SUMMARY

One embodiment of the present application includes multipass pipelining, a microarchitectural technique that exploits compile-time scheduling while providing for persistent, advance execution of instructions otherwise blocked behind data-cache-interlocked instructions. Its performance may approach that of an ideal out-of-order execution design while incurring relatively less power and complexity overhead. This result can be accomplished by taking multiple in-order passes through instructions following what would normally be an interlock. Typically, each pass increases the speed and energy efficiency of the subsequent passes with its valid execution results preserved in a result buffer. These results may be used to break dependences during subsequent passes, allowing instruction grouping logic, if present, to form larger groups of instructions which can be executed simultaneously without reordering instructions. During each pass, instructions with valid results from previous passes do not require further reexecution.

One aspect of the multipass approach is its ability to balance the need for long-range advance execution to overlap more cache misses, with the need for making multiple shorter-range advance execution passes, to correspondingly exploit newly-arrived, advance, shorter-latency-load miss results. This aspect includes a mechanism that initiates the next pass when continuing the current advance execution path is unlikely to be productive.

Another embodiment of the present application is a unique processor pipeline. Other embodiments include unique microarchitecture, methods, systems, devices, and apparatus to perform multipass advance execution processing of program instructions.

Accordingly, one object of the present application is to provide a unique processor pipeline.

Alternatively or additionally, another object of the present application is to provide a microarchitecture, system, method, device or apparatus to perform multipass instruction processing during advance execution operation.

Further objects, features, forms, aspects, embodiments, benefits, and advantages shall become apparent from the description and figures provided herewith.

DETAILED DESCRIPTION OF REPRESENTATIVE EMBODIMENTS

Figure 1:
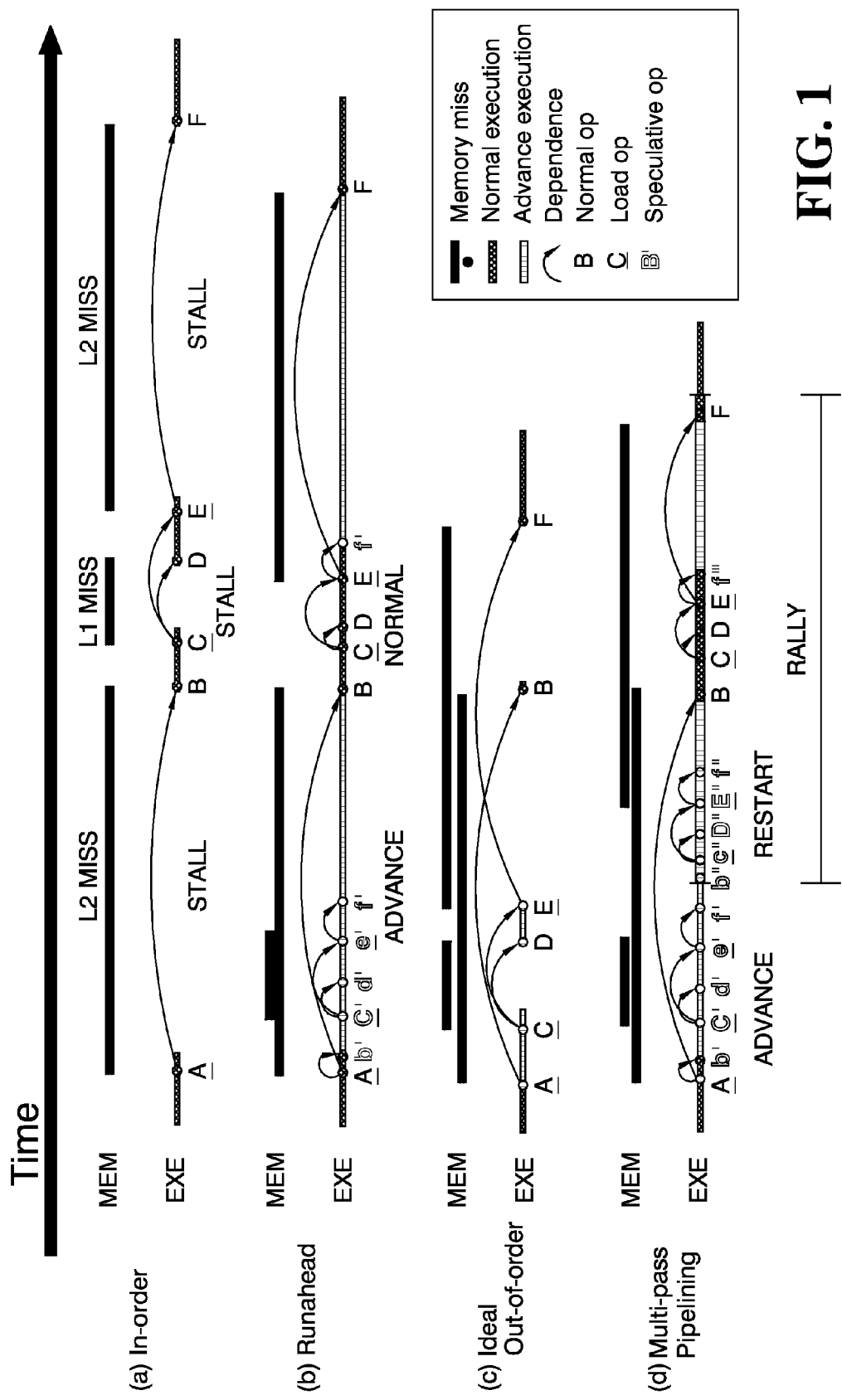
FIG. 1 depicts comparative timelines of different processor instruction issue models.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 shows example instruction execution timelines for several different models of execution that are respectively labeled (a)-(d). For each model, the execution activity is divided into actual instruction execution (EXE) and the handling of data cache misses caused by executing load instructions (MEM). In each example, the EXE line represents many executing instructions. A few instructions of interest are shown as points labeled with A-F on the timeline. Instructions A, C and E are load instructions that miss in the data cache, and are further distinguished by underlining in FIG. 1. Two types of misses are shown in FIG. 1: relatively long misses (L2 MISS) and relatively short misses (L1 MISS). Data dependences between these instructions are shown as arrows to the dependent instruction.

FIG. 1, timeline (a) demonstrates the problem that accompanies in-order processors—instructions can become artificially stalled behind consumers of load instructions which missed in the data cache. When instruction A misses in the data cache, instructions that are independent of instruction A continue to execute, causing desirable overlap between EXE and MEM activities. A stall-on-use occurs when instruction B, the first consumer of load instruction A, is reached. For the remaining duration of the cache miss caused by instruction A, the in-order processor is stalled, represented by the gap in the EXE timeline before instruction B. Similar gaps in execution are also triggered by instructions D and F, the consumers of load instructions C and E that miss in cache. Performance can be improved by shrinking the EXE time gaps (via increased overlap with cache miss time gaps) and/or speeding up the EXE segments between gaps, as demonstrated in timelines (b) and (d) of FIG. 1.

A runahead preexecution approach reduces the execution gaps by increasing the overlap between cache miss handling of independent memory loads, as illustrated in timeline (b) of FIG. 1. When instruction B attempts to use the result of A before the cache miss handling completes, rather than stalling instruction B and all the subsequent instructions, the runahead approach allows execution to continue in a speculative manner; where the speculative forms of instructions A-F are designated letters with primes ('). Also, as further explained hereinafter, lower case prime letters designate instructions that cannot compute a valid result (such as instruction b'), (i.e. they are deferred or cannot be successfully re-executed), and upper case letters designate instructions that can compute to a valid result (such as instruction C'). This speculative execution is shown as the segment of the EXE line, marked as "ADVANCE" in the timeline between b' and B. During speculative execution, instruction b' cannot compute a valid result. The execution of instruction b' is feigned, and it bypasses and writes its specially marked non-result to its consumers and destination. Execution continuing past instruction b' reaches independent instruction C' which can thus begin its memory access, overlapping its access with that of instruction A. This overlap of cache miss handling of independent loads is represented in timeline (b) by the overlapping line segments in the MEM component of the timeline.

Typically, two limitations can result from the runahead approach of timeline (b). The first limitation is that once an instruction's execution is skipped during runahead execution, it will not be considered again until normal execution begins again. In timeline (b), instruction e' is skipped during runahead execution. When cache miss handling for instruction C' completes, instruction e' has already missed its opportunity for execution. Therefore cache miss handling for instruction E cannot be overlapped with that for instructions A and C'. A second limitation is that none of the valid computation results from runahead execution are persistent because runahead execution is only a prefetching technique. In timeline (b), the pipeline still has to execute instructions B through F after the cache miss handling for instruction A completes. This approach results in longer overall execution time to the extent that the EXE and MEM timelines are serialized. Furthermore, each instruction can consume execution energy multiple times.

Timeline (c) of FIG. 1 depicts a theoretical timeline for an ideal out-of-order execution model. In this example, while the cache miss caused by instruction A is being handled, wake-up logic in a dynamic instruction scheduling mechanism allows execution of all subsequent instructions in the program instruction stream as instruction operands become ready. This approach allows the overlap of the cache miss for instruction C with that of instruction A. The execution of instruction E occurs immediately after instruction C completes, so that the "miss" handling for instruction E is now overlapped with that for instruction A. Also, instructions C through E do not need to be reexecuted after the cache miss handling for instruction A completes, which can save substantial execution time and energy after long-latency cache miss. A large instruction window equipped with potentially large scheduling tables, reorder buffers, and load-store queues are typically needed to approach the ideal out-of-order execution model, which may come with unacceptably high power and complexity cost. Accordingly, contemporary out-of-order processors typically realize only a fraction of the potential benefit.

Timeline (d) of FIG. 1 shows the execution timeline of multipass pipelining. In one embodiment, the multipass approach performs multiple passes through the instructions subsequent to the consumer of a missing load, and recognizes that during advance execution, as instructions are suppressed because of unavailable source operands, the speculative state may become contaminated to such an extent that continued advance execution is halted. Rather than wasting execution effort further down the instruction stream, the advance execution can be restarted at the consumer instruction that triggered the advance execution—in other words, a new pass takes place through at least some of the same instructions. For the timeline (d) example, the multipass pipeline restarts the advance execution at instruction b" shortly after instruction f'. During a second pass, the relatively short cache miss handling for instruction C' has completed. Therefore, instruction E" in the second pass can now trigger its cache miss handling before the miss handling for instruction A completes. In this example the number of primes for the designated instruction letter corresponds to the number of passes executed (such as three for the f" instruction).

In one form, the multipass pipeline restarts the runahead execution at the original consumer instruction B, even though it may not yet be ready for execution. Thus, in contrast to out-of-order pipeline arrangements, the advance execution is restarted to capitalize on any additional instructions with operands that may have become ready since the last pass, such as instructions D" and E". Alternatively or additionally, the multipass pipeline of this embodiment preserves valid execution results during advance execution and uses them to reduce power consumption and speed-up execution once nominal execution operation has resumed. When advance restart occurs, the preserved results from the prior pass are used to avoid executing speculative instructions like instruction c" again, which can facilitate reaching a valid instruction more rapidly during a subsequent pass, such as instruction E" in timeline (d). When the processor returns to normal execution, the preserved results for instructions C and d are used to speed-up the processing of these instructions while saving energy. This multipass pipelining technique facilitates productive processing of independent instructions during the memory stall cycles left exposed in traditional in-order pipelines. In one experimental example, this technique is demonstrated by adapting a contemporary in-order pipeline design—that of Intel Corporation's Itanium 2 model.

Figure 2:
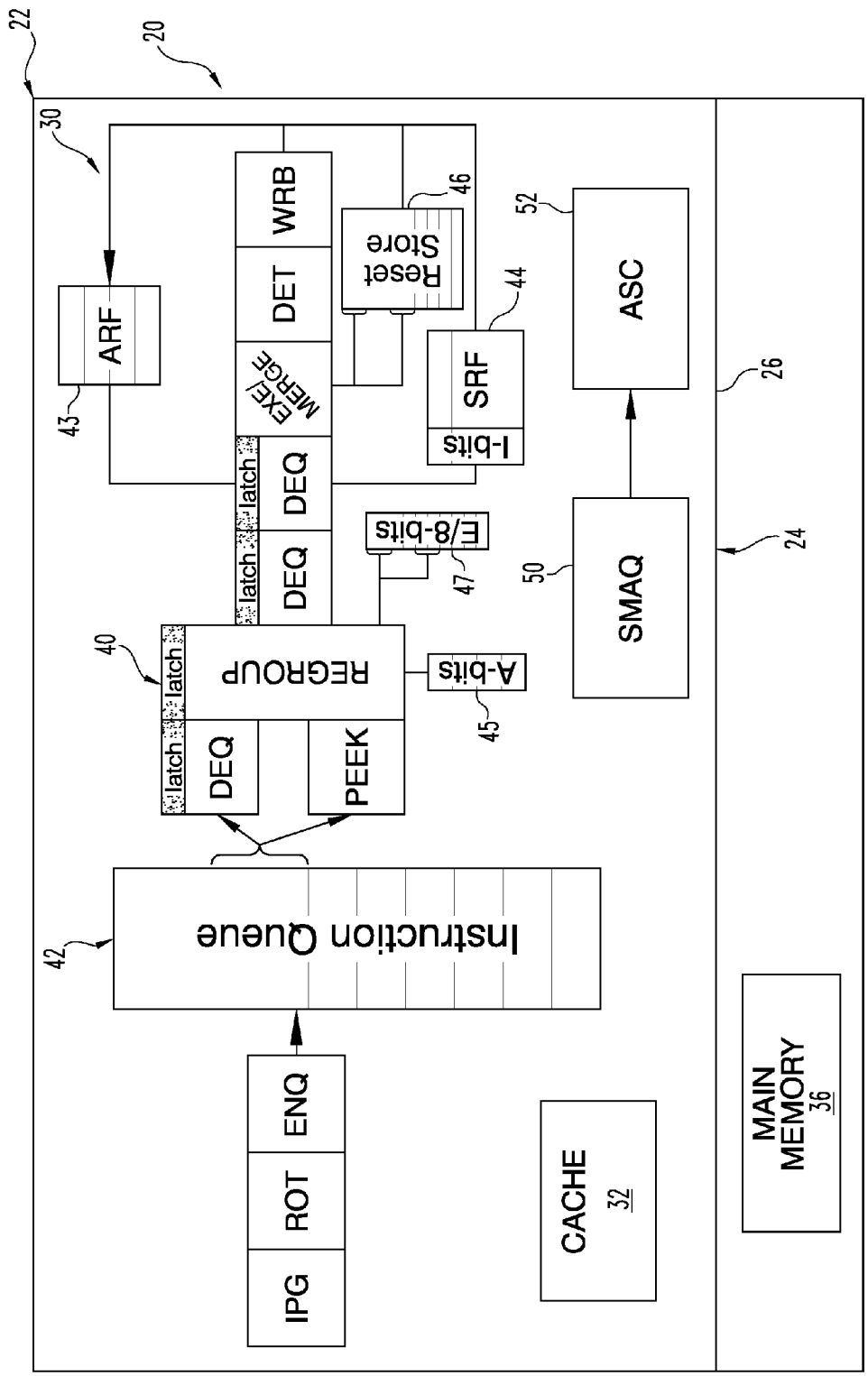
FIG. 2 is a diagrammatic view of a processor with an instruction pipeline to perform multipass processing.

FIG. 2 depicts computer processing system 20. System 20 includes processing device 22 with processor 24 in the form of an integrated circuit 26, and main memory 36. Processor 24 includes processing architecture 30 and cache 32. Architecture 30 includes multipass processing pipeline 40 for executing processor programming instructions and First-In, First-Out (FIFO) buffer 42. In one form, buffer 42 holds up to 24 instructions or at least four cycles worth of instructions. To accommodate the delay of buffer 42, two new stages are provided that dequeue (DEQ) and enqueue (ENQ) (or peek at (PEEK)) instructions in buffer 42, as illustrated in FIG. 2. A third stage is added to perform instruction regrouping (REGROUP), as further described hereinafter. Also included in architecture 30 is a speculative memory address queue (SMAQ) 50 and an advance store cache (ASC) 52.

Figure 3:
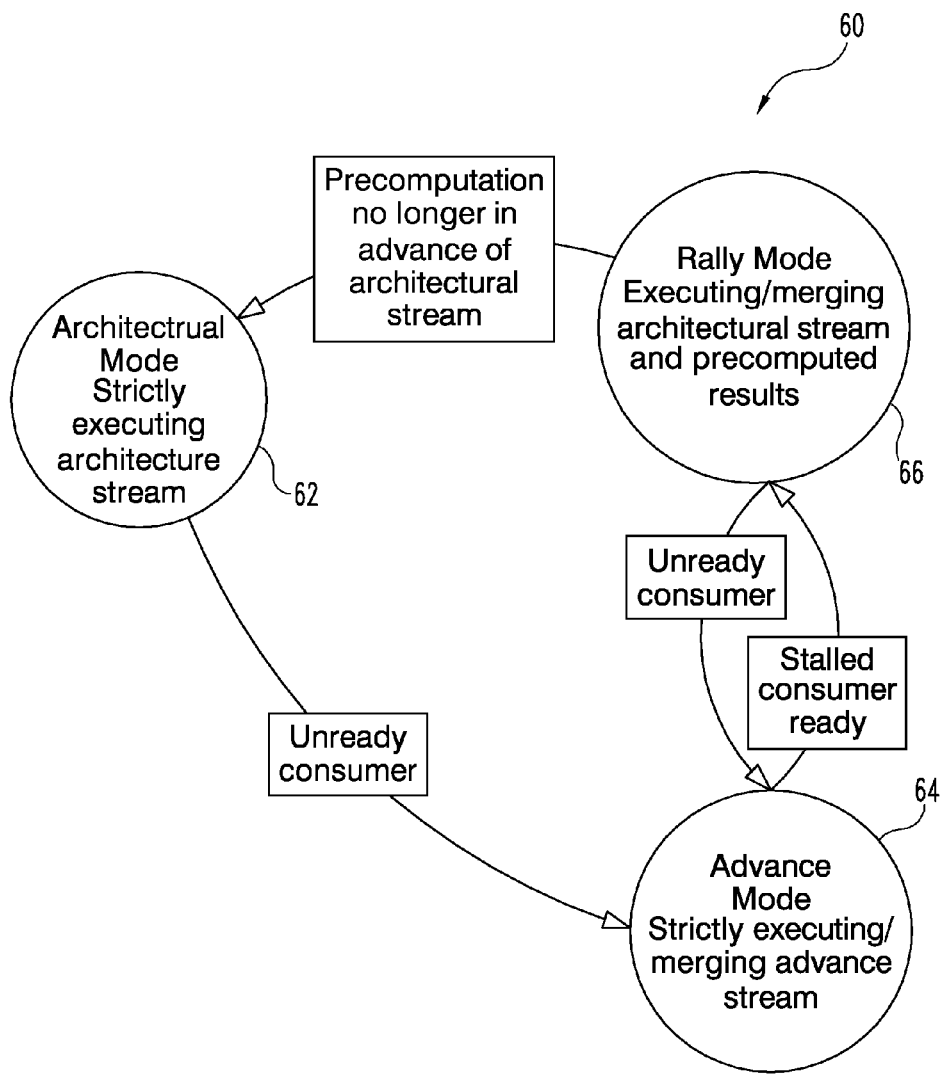
FIG. 3 is a state diagram representative of different operating modes of the processor of FIG. 2.

Because, in the multipass pipeline, both normal and advance execution occur on the same physical pipeline at different times, pipeline 40 operates in different operating modes. FIG. 3 is a state diagram representative of the operation of architecture 30 in several different processing modes or states, which is generally designated as operating logic 60. Operating logic 60 may be embodied in processor 24 in any form, such as software, firmware, controlware, hardware embodied state-logic, and/or a different type, to name just a few. In accordance with operating logic 60, pipeline 40 initially enters the architectural, nominal, or general operating mode of execution when program execution starts, which is designated as state 62. In the absence of runtime stalls, instructions are released from the instruction buffer 42 using the DEQ pointer. During the architectural operating mode, the structures specific to multipass pipelining are unused and can be clock gated for power efficiency.

Figure 4A:
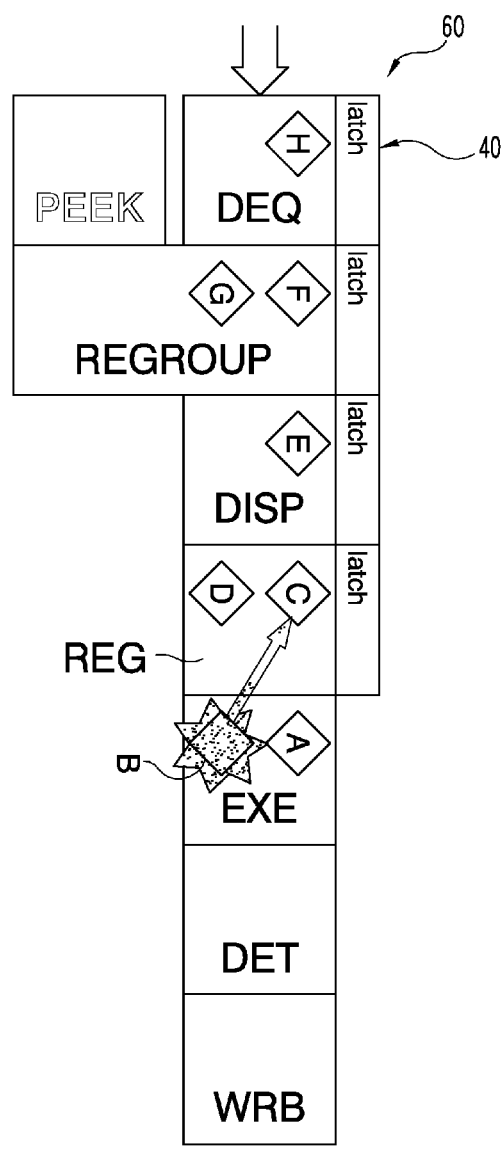
FIGS. 4A-4C are diagrammatic views of operational cycles corresponding to multipass processing.
Figure 4B:
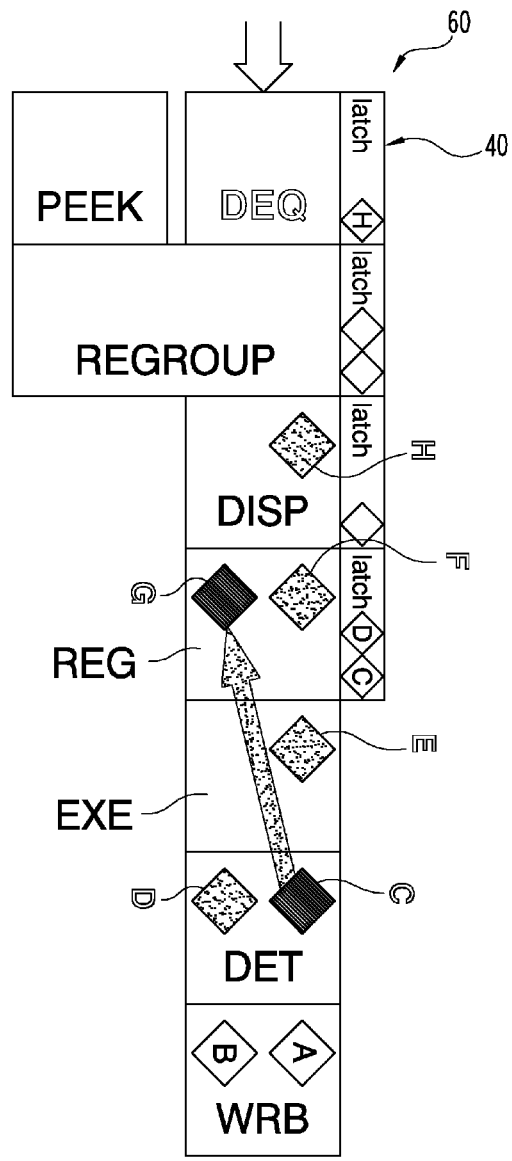
Figure 4C:
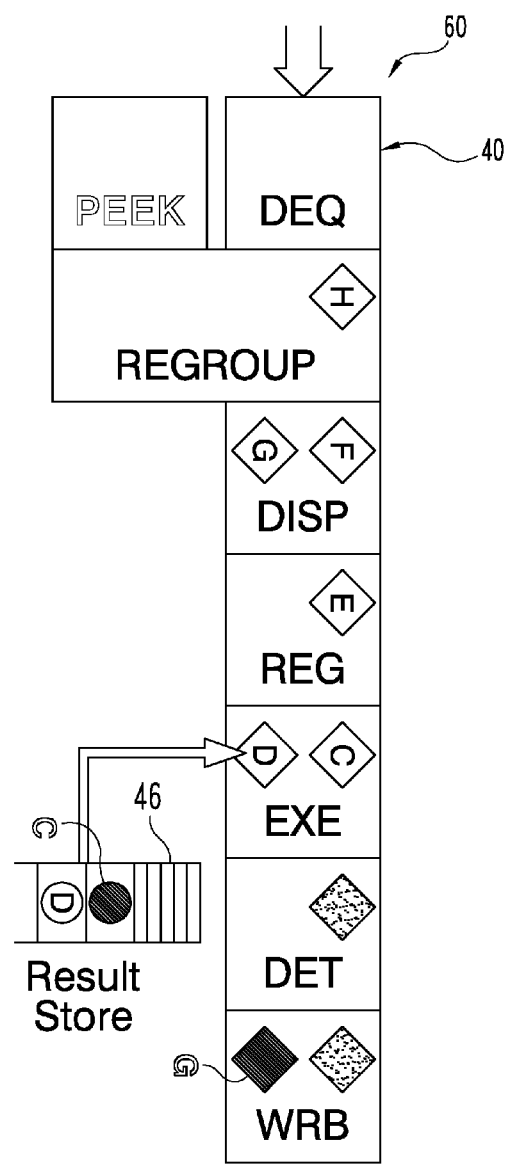

Multipass advance preexecution of state 64 begins with the failure of an instruction to receive a valid operand (unready consumer). Advance preexecution corresponds to an exception operating mode of pipeline 40 caused by this failure—typically resulting from a cache miss. FIGS. 4A-4C relate to this condition (state 64) and further elucidate various aspects of operating logic 60. For example, in FIG. 4A, load instruction B misses in cache, causing dependence checking logic in the REG stage to detect an unready operand for instruction C. At this point, the pipeline enters the advance execution operating mode of state 64. All in-flight instructions from the triggering instruction back to the instruction queue (C to H) are latched at their respective stages, for reasons discussed hereinafter. The DEQ pointer is also preserved and subsequent instructions are released from the instruction buffer using the PEEK pointer. These instructions proceed through the pipeline as the advance instruction type. During advance mode, any instructions failing to receive valid input operands are suppressed. An invalid (I) tag is attached to the output values of these instructions to indicate that they were deferred. This tag in turn suppresses consumers of the result for each of the suppressed instructions. The multipass pipeline 40 in advance mode selectively executes only the advance stream instructions that receive valid input data.

Advance stream instructions are not allowed to write their results into the architectural register file (ARF) 43 utilized by pipeline 40 during nominal execution operation. Instead, the results of advance instruction streams are redirected to the speculative register file (SRF), 44 which stores the speculative state for the current pass of advance preexecution. When pipeline 40 enters advance mode, SRF 44 does not contain any valid information and advance stream instructions initially access ARF 43 for their input operands. As advance stream instructions write into SRF 44, the consumers of their results are redirected to SRF 44 for input operands. This redirection is realized with a bit vector, shown as A-bits 45 in FIG. 2. Each advance bit of A-bits 45 indicates that future accesses to its associated register entry should be redirected to SRF 44.

During architectural mode, A-bits 45 are clear, and all instructions read operands from the ARF 43. In advance mode, each instruction sets A-bits 45 associated with its destination register(s), directing their subsequent consumers to fetch from SRF 44. Each SRF 44 entry contains an I-bit that marks invalid values written by suppressed advance stream instructions. Advance instructions reading a register with a set I-bit are suppressed. The logic for bypassing between in-flight advance stream instructions is described further hereinafter. Advance instructions are also not allowed to change the memory state, instead using the SMAQ 50 and advance store cache 52 to enforce memory dependences and forward memory values, as further described hereinafter.

Results of correctly executed advance stream instructions are preserved in a result store (RS) 46. The RS 46 is written in addition to the SRF 44 by advance instructions. There is one-to-one correspondence between instruction buffer 42 and RS 46 entries. The RS 46 entries corresponding to suppressed advance stream instructions are marked empty with an E-bit. In FIG. 2, E-bit vector 47 with entries corresponding to the RS 46 is read in the REG stage. During advance mode, the advance restart mechanism, as further explained hereinafter, determines if advance mode execution should be returned to the instruction that originally triggered the current advance mode execution, e.g. instruction C in FIG. 4B, for example. At this point, all A-bits 45 are cleared, effectively clearing the SRF 44.

During advance mode restart, the contents of the instruction queue and the result store (RS) 46 remain preserved. The RS 46 contents are used to speed-up the processing of advance instructions if these instructions have been successfully executed in a previous pass of advance mode. The E-bits 47 are used by the regrouping logic to determine the instructions that no longer have flow-or anti-dependences due to the availability of their result value. In one implementation, the reduced dependences allow the regrouping logic to form larger instruction issue groups without reordering these instructions, which can allow pipeline 40 to process the same instruction stream faster. Typically, due to the result store, pipeline 40 does not have to spend the energy to execute an instruction whose results are available from prior advance-mode execution; and, long-latency instructions, such as multiply instructions, are effectively converted into single cycle instructions with this feature, further reducing potential stalls in a subsequent rally mode of state 66 (FIG. 3).

During advance mode, the availability of the delayed input operand of the instruction that triggered advance mode is monitored. When its input operand becomes available for bypass in the REG stage (stalled consumer ready), the pipeline switches to the rally mode of state 66 in which architecture-stream instructions resume execution. The latched instructions are unlatched and displace the advance-mode instructions in their respective stages. As was the case for restart in the advance mode, the rally mode uses contents of RS 46 and the A-bits 45 to speed-up the execution of architecture-stream instructions that have already been correctly preexecuted in advance mode.

If any architecture-stream instruction receives an invalid operand bypass value at the REG stage, the pipeline switches to advance mode again from the rally mode (unready consumer). Alternatively, if the DEQ pointer reaches the farthest point of the preserved PEEK pointer while in the rally mode, then the architecture stream has caught-up with the farthest point of pre-execution. This status indicates that there are no longer any instructions deferred on pending cache misses. Correspondingly, precomputation is no longer in advance of the architectural status stream, and pipeline operation changes from the rally mode state 66 back to the nominal architectural operating mode of state 62, and halt the multipass-specific structures.

In FIG. 4C, architectural execution has resumed with the in-order dequeuing of instructions. Instructions that were correctly preexecuted read their result from RS 46 rather than reexecuting. When earlier preexecution included cache misses (or other long-latency operations) as described in connection with FIG. 1, architectural execution is likely accelerated through the reduction or elimination of future stalls.

Because of the persistent execution performed during advance mode, much of the rally mode execution is directed to merging precomputed instruction results into the processor state. Because the results of precomputed instructions are not recomputed (with the exception of data-speculative loads as detailed hereinafter in connection with advance memory instructions), such instructions can be considered to no longer be dependent on the original producers of their source operands. This elimination of input dependences permits issue regrouping. New instruction issue groups can be formed without changing the compiler-specified instruction order. Instruction regrouping is done by checking dependences on an instruction-by-instruction basis in the REGROUP stage. Preexecuted instructions, marked with their corresponding E-bits 47, are independent of all other instructions, thus allowing a dynamic schedule compaction beyond what was possible at compile time.

As advance execution proceeds, often a point is reached where little fruitful forward advance execution can be performed because the vast majority of subsequent instructions are dependent upon cache-missing load instructions or deferred instructions. Frequently at the same time, instructions which have previously been deferred because of an unready operand may now represent an opportunity for productive preexecution. In one implementation, advance restart is controlled by identification of critical instructions. A. Roth and G. S. Sohi, Speculative data-driven multithreading, in Proceedings of the Seventh International Symposium on High-Performance Computer Architecture, pages 37-49, January 2001; and S. Srinivasan et al., Locality vs. criticality, in Proceedings of the 28th Annual International Symposium on Computer Architecture, pages 132-143, July 2001 provide additional background materials on critical instruction determination and are hereby incorporated by reference each in its entirety. In other implementations, advance restart is controlled by the arrival of data from some other memory load instruction or by a microarchitectural predictor which predicts when restart is advantageous.

Restart may be desirable if a deferred instruction will cause the vast majority of subsequent preexecution to be deferred. For the experimental examples presented herein, the restart instructions are explicitly inserted by the compiler to direct advance restart; however, additionally or alternatively, a hardware mechanism could be used to detect such situations. During compile time, strongly connected components (SCCs) of the data-flow graph are found: these components represent loop-carried data flow. In one implementation, if a SCC precedes a much larger number of multiple-cycle or variable-latency (such as load) instructions than the SCC succeeds in the dataflow graph, the load instructions in the SCC are considered critical. RESTART is inserted after every load instruction in the SCC, consuming the destination of the load instruction. When the operand for the RESTART is not ready, advance restart occurs, otherwise the instruction has no effect. The A-bit vector 45 and advance store cache 52 are cleared, and latched instructions in the DEQ, DISP, REGROUP and REG stages are unlatched. Alternatively or additionally, a microarchitectural mechanism could be used to redirect PEEK to the initial advance instruction early, so that the instruction arrives at either the REG stage or the EXE stage at the same time as its input.

Generally, multipass pipelining should not undesirably commingle architectural stream and advance stream values. Bypasses between advance and architectural mode instructions are prevented through the addition of the A-bit to each register identifier in the bypass network, indicating whether an advance or architectural instruction generated the value being bypassed. Advance instructions set the A-bit of their destinations in the EXE stage denoting that advance preexecution supersedes the value stored in ARF 43 for that register. The A-bit of each instruction operand is read during advance mode in the REGROUP stage, dictating to an instruction which register file to later read in the REG stage. Some advance instructions may read stale values from ARF 43 if the producer of their operand has yet to write the A-bit vector 45, but the appropriate advance value will be provided later via the bypass network. Advance instructions accept the bypass of the most recently executed instruction; and architectural instructions ignore bypasses marked with the A-bit.

In one experimental implementation, all instructions were issued strictly in-order, but variable-latency instructions might complete out-of-order, because a shorter-latency writer might follow a longer-latency writer of the same operand. Out-of-order instruction completions cannot be allowed to cause inconsistent register state. Because the processor for this implementation does not dynamically rename register operands, variable-cycle latency instructions (in particular loads) are scoreboarded to force output dependent instructions to stall. The architectural stream of execution stalls when write-after-write (WAW) dependencies are presented. However, an alternate approach is preferred for the execution of advance instructions. Dynamic WAW dependencies are reached frequently in loops because dynamic instances of the same static instruction are output dependent. Additionally, when WAW is reached in advance execution, all consumers of the first write have already been processed (and deferred) so there is no reason to stall on these writes. An alternative approach is for none of the advance load instructions that miss in the first level cache to write back to the speculative register file to avoid WAW concerns. These loads will eventually write their results to RS 46, but all consumers of missing loads will be deferred until a subsequent pass. Alternative solutions suppress the register file write back of loads only once WAW occurs.

Figure 5:
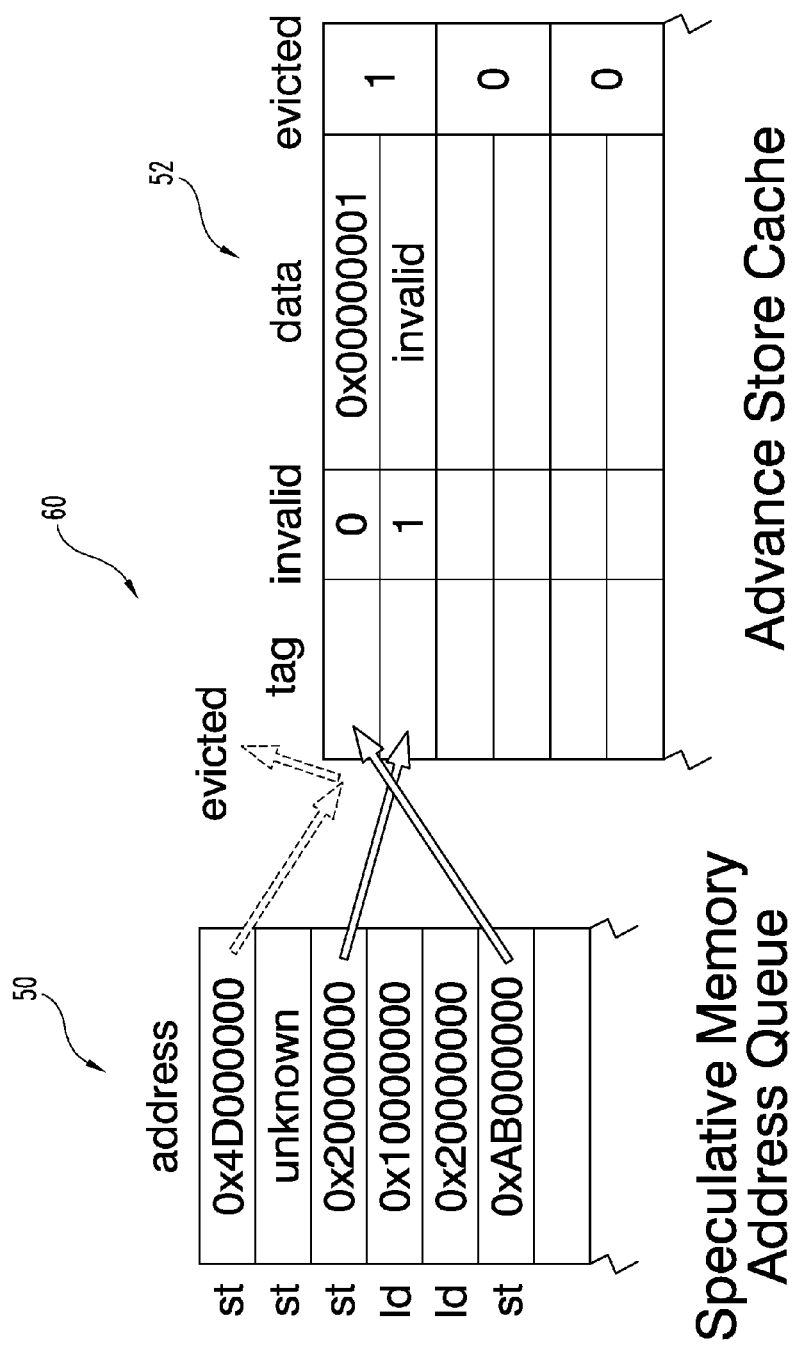
FIG. 5 is a diagrammatic view of structures for handling memory instructions during advance execution.

The multipass-pipelined system 20 maintains an underlying in-order execution model. Advance-stream instructions, because they are processed out of program order from the architecture stream, are speculative and their processing does not directly affect the architectural state. The purely speculative processing of non-memory instructions is handled with the addition of the SRF. Memory instructions require additional treatment. All load and store instructions are allocated entries in an address table at the time of instruction dispersal. Preexecuting (but not deferred) memory instructions enter the address of their access in SMAQ 50, which is shown in FIG. 5 in greater detail. The SMAQ 50 is used by advance stream memory instructions to avoid rereading their address operands in the rally mode of state 66. An advance store's data operand is also preserved in RS 46 and reused in a similar manner. Though they do not reread their input operands, preexecuted stores and dynamically data-speculative loads perform memory accesses in rally mode as described later in this section. Therefore, SMAQ 50 and RS 46 together allow instruction regrouping to place preexecuted memory instructions in the same execution cycle as their address or data calculation instructions.

Traditionally, store buffers are used to support forwarding data that is not yet visible in the data cache from store instructions to load instructions. To support a window of in-flight stores and loads in multipass pipeline 40, ASC 52 is utilized, which is a low-associativity cache structured to nominally forward data during advance mode. Table I depicts certain aspects of the operation of ASC 52 in greater detail as follows:

TABLE I

I. ST to unknown address
    All future LDs data speculative
II. ST of unknown data
    Mark line invalid
III. Eviction of line
    Mark set evicted
    Future LDs to that set are data speculative At the beginning of each pass of advance execution, ASC 52 is cleared. Load instructions access the standard cache 32 for data. As advance stores execute, they deposit their data into ASC 52 (not to the standard cache). Subsequent advance load instructions access both cache 32 and ASC 52, with cache hits in ASC 52 overriding those from cache 32. As long as advance store values can be forwarded through ASC 52, consistent memory interface is maintained. For example, if a store has an invalid data operand, the result of a load to the same location is also invalid. However, advance stores may be deferred due to an unavailable target address. Out-of-order processors tend to use content-addressable load-store queues for detecting when the load is dynamically reordered with a conflicting store. This approach could be used by multipass pipelining, but it is typically unnecessary—adding a hardware complexity that could limit the reorderable window of instructions. Replacement in ASC 52 and a low associativity of ASC 52 typically allow it to support a large window of instructions while communicating to subsequent load instructions values that are either correct, invalid, or data speculative (because of replacement). Exploiting the fact that advance-mode instructions will be processed again after they are dequeued in future passes, multipass pipelining generally takes a value-based approach to preserving memory consistency through the in-order processing in rally mode.

If a store instruction is deferred because of an unknown address operand, all future load instructions (and their dependents) are data speculative. Similarly, advance load instructions that miss from ASC sets that have undergone replacement are treated as data speculative. When such load instructions are processed in advance mode, their results are marked data-speculative with a set S-bit corresponding to that instruction's entry in RS 46. When these data speculative instructions are reprocessed in rally mode, they will reperform their memory accesses, using their addresses from the SMAQ 50. If the value loaded is not the same as the value that was loaded during advance mode, a pipeline flush is performed.

A comparison of the multipass and out-of-order hardware structures was estimated using microarchitectural power models adapted from D. Brooks, V. Tiwari, and M. Martonosi. Wattch: framework for architectural-level power analysis and optimizations, Proceedings of the 27th Annual International Symposium on Computer Architecture, pages 83-94, June 2000 (hereinafter "Wattch"). Technology parameter estimates for a 100 nm device dimensioning process were chosen to approximate device characteristics of a contemporary high-performance microprocessor using a $V_{dd}$ of 1.2V and a frequency of 2 GHz. In the evaluated architecture, 128 integer, 128 floating point, and 64 predicate registers are visible to the instruction set. Data and memory addresses are 32 bits wide and data is associated with an additional NaT bit for compiler speculation support. Decoded instructions are 41 bits wide and 6 instructions can be issued per cycle. Table II illustrates power ratios for out-of-order versus multipass structures for a 100 nanometer (nm) device process as follows:

TABLE II

| Out-of-Order Structures | Multipass Structures | Peak Power Ratio | Average Power Ratio |
|---|---|---|---|
| Combined Architectural & Renamed Register File (512 registers, 12R/8W ports) | Architectural & Speculative Register Files (each 256 registers, 12R/8W ports) | $0.99^3$ | 1.20 |
| Register Alias Table (array: 256 entries, 9 bits, 12R/6W ports) | Result Store (2-banked array: 256 entries, 1 wide-read & 1 wide-write & 2 single-write ports) | | |
| Instruction Wakeup (wired-OR resource dependence matrix: 128 entries, 329 bits) Instruction Issue (128 entries, 19 bits, 6R/6W ports) | Instruction Queue (2-banked array: 256 entries, 1 wide-read & 1 wide-write port) | 10.28 | 7.15 |
| Load Buffer (CAM: 48 entries, 2R/2W ports) Store Buffer (CAM: 32 entries, 2R/2W ports) | Speculative Memory Address Queue (SMAQ), (2-banked array, 128 entries 2R/2W ports) Advance Store Cache (ASC) (2-way set associative cache, 64 entries, 2R/2W ports) | 3.21 | 9.79 |

Table II shows the ratio of the power of structures specific to out-of-order execution in comparison to multipass structures which serve similar purposes; where a ratio greater than one indicates higher out-of-order power. The peak power ratio assumes maximum switching activity. The average power ratio is based on simulated results with the Wattch linear clock gating model: it was measured by incorporating the relevant Wattch component models into the cycle-by-cycle simulator used for performance results. The Wattch component power models consist primarily of array components: decoders, wordlines, bitlines, and senseamps. For these structures, power is expected to scale nearly linearly with the number of ports. An additional effect is encountered due to the increase in cell size because of the additional wordlines and bitlines needed for access. Because content-addressable memories (CAMs) read out their entire contents and match them, they are typically more costly in terms of power than indexed arrays. Accordingly, it is believed that multipass power savings generally result from the avoidance of CAMs and reduction in the number of ports due to always-sequential execution. While Table II demonstrates the degree of disparity between out-of-order and multipass structures, it does not represent the power consumption of any actual physical implementation.

A number of simulated experiments were conducted to test the effectiveness of multipass pipelining. While the technique is applicable across in-order microarchitectures, an EPIC platform based generally on the Itanium 2 architecture of Intel Corporation was chosen for these studies. Twelve C-language benchmarks were selected from SPEC CPU2000 to test the performance of multipass pipelining. These benchmarks represent a wide variety of application types. Each application was compiled through the OpenIMPACT IA-64 compiler of the University of Illinois Champaign-Urbana using the SPEC-distributed training inputs to generate basic block profile information. Interprocedural points-to analysis was used to determine independence of load and store instructions, enabling code reordering during optimizations. Optimizations performed include inlining, hyperblock formation, control speculation, modulo scheduling, and acyclic intrahyperblock instruction scheduling.

To evaluate the multipass pipelining paradigm, an in-order model, multipass model and an idealized out-of-order simulation model were developed. Table III is directed to an experimental machine configuration as follows:

TABLE III

| Feature | Parameters |
| --- | --- |
| Functional Units | 6-issue, Itanium 2 FU distribution |
| Data model | ILP32 (integer, long, and pointer are 32 bits) |
| L1I Cache | 1 cycle, 16 KB, 4-way, 64 B lines |
| L1D Cache | 1 cycle, 16 KB, 4-way, 64 B lines |
| L2 Cache | 5 cycles, 256 KB, 8-way, 128 B lines |
| L3 Cache | 12 cycles, 3 MB, 12-way, 128 B lines |
| Max Outstanding Misses | 16 |
| Main Memory | 145 cycles |
| Branch Predictor | 1024-entry gshare |
| Multipass Instruction Queue | 256 entry |
| Out-of-Order Scheduling Window | 128 entry |
| Out-of-Order Reorder Buffer | 256 entry |
| Out-of-Order Scheduling and Renaming Stages | 3 additional stages |
| Out-of-Order Predicated Renaming | Ideal |

Table III depicts the relevant machine parameters derived from the Intel Itanium design. This contemporary cache hierarchy was chosen to model an achievable near-term design; forward looking cache parameters were also considered as further described hereinafter. A model using 32-bit pointers was assumed. The out-of-order model used for comparison with multipass pipelining was constructed to give an idealized indication of the performance opportunities from dynamically ordering instructions. Some of the performance limiting overheads of out-of-order execution were excluded from the model to demonstrate the relatively ideal performance potential from dynamic scheduling. One example is that scheduling and register file read are performed in the REG stage, eliminating the need for speculative wakeup of instructions as in modern implementations. Another example is an ideal register renamer, which does not account for the issues of register renaming in the presence of predicated code and the performance cost of realistic implementation.

Figure 6:
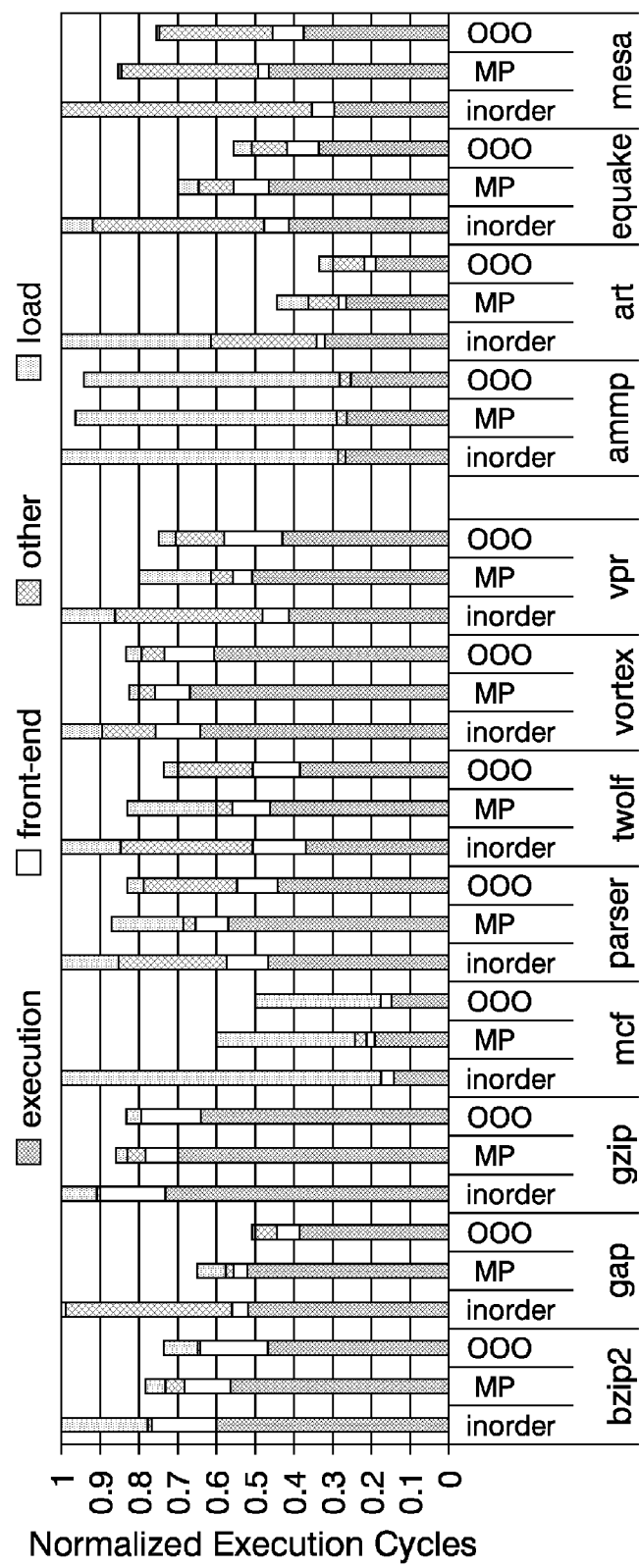
FIG. 6 depicts a comparative graph of normalized execution cycles for different instruction handling models: baseline (base), multipass (MP), and out-of-order (OOO).

Benchmark execution cycle counts are shown in FIG. 6 for baseline in order (inorder), multipass pipelining (MP) and out-of-order (OOO) models, that were normalized to the number of cycles in the baseline machine. Within each bar, execution cycles are attributed to four categories: execution in which instructions are issuing without delay; front-end stalls including branch misprediction flushes and instruction cache misses; other stalls on multiplies, divides, floating-point arithmetic and other non-unit-latency instructions, and stalls on resource conflicts; and load stalls on consumption of unready load results. For multipass pipelining in advance mode, cycles when no new instruction executions occur (as opposed to merges or deferrals) are attributed to the unsatisfied latency that initiated advance mode. Cycles when out-of-order execution does not execute a single instruction are attributed to the oldest instruction stall (or as a front-end stall in the case of an empty instruction queue).

A significant number of memory stall cycles are eliminated through multipass pipelining for each benchmark. For example, mcf, the CINT2000 benchmark with the worst cache-miss behavior shows 56% reduction in memory stall cycles and 47% reduction in overall stall cycles. In other benchmarks, a slight reduction in total execution cycles is achieved through preexecution of branch instructions. For example, in twolf, a 29% reduction in front-end stall cycles is achieved. The average reduction in total stall cycles (both load and non-load) due to application of multipass pipelining is 49%, yielding 1.36× average speedup. Overall, ideal out-of-order execution in these simulations only achieve an additional 1.14× speedup over the multipass pipelined system model—most likely due to its ability to find instruction-level parallelism by reordering instruction executions and its more general tolerance of run-time latency. The out-of-order model evaluated is very aggressive, so a model was also examined using decentralized scheduling tables for memory, and floating point and integer instructions with 16 entries. Because of the reduced parallelism achieved with the more quickly filled scheduling resources of this out-of-order model, multipass pipelining achieved a speed up in these simulations of 1.05× over the multipass pipeline model.

Figure 7:
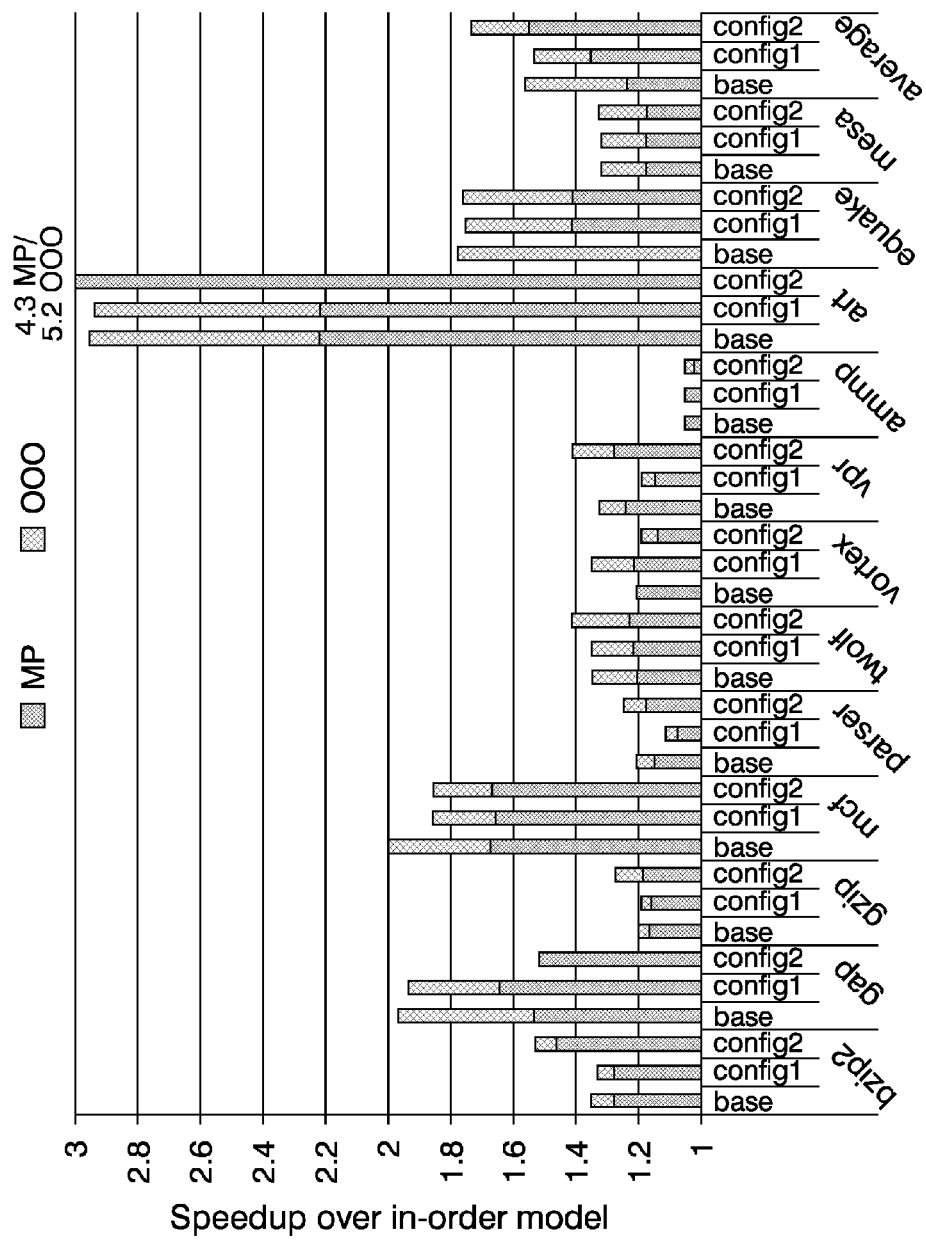
FIG. 7 depicts a comparative graph demonstrating speedup of multipass pipelining and out-of-order execution with varying cache sizes and latencies: base, config1 (base with 200 cycle main memory), and config2 (1 cycle 8 KB L1/7 cycle 128 KB L2/16 cycle 1.5 MB L3/200 cycle MM).

FIG. 7 demonstrates performance due to changing the cache hierarchy from the aggressive, contemporary model shown in Table III. High-performance in-order processors address their intolerance of cache misses through large, fast caches. As processor speeds increase, the relative speed to main memory will also likely increase. Additionally, because of power constraints, very large, low-latency caches may become increasingly difficult to implement. Three cache hierarchies are evaluated, with increasing cycle latency and decreasing cache sizes. The speedup over an in-order processor is shown for both the multipass and out-of-order model. In general, as the average latency of memory access is increased due to less-effective caching hierarchies, the latency tolerance effectiveness of both multipass pipelining and out-of-order execution vary across benchmarks; however, they remain the same on average. It should be appreciated that the difference between multipass and out-of-order performance typically narrows with more restrictive hierarchies.

Figure 8:
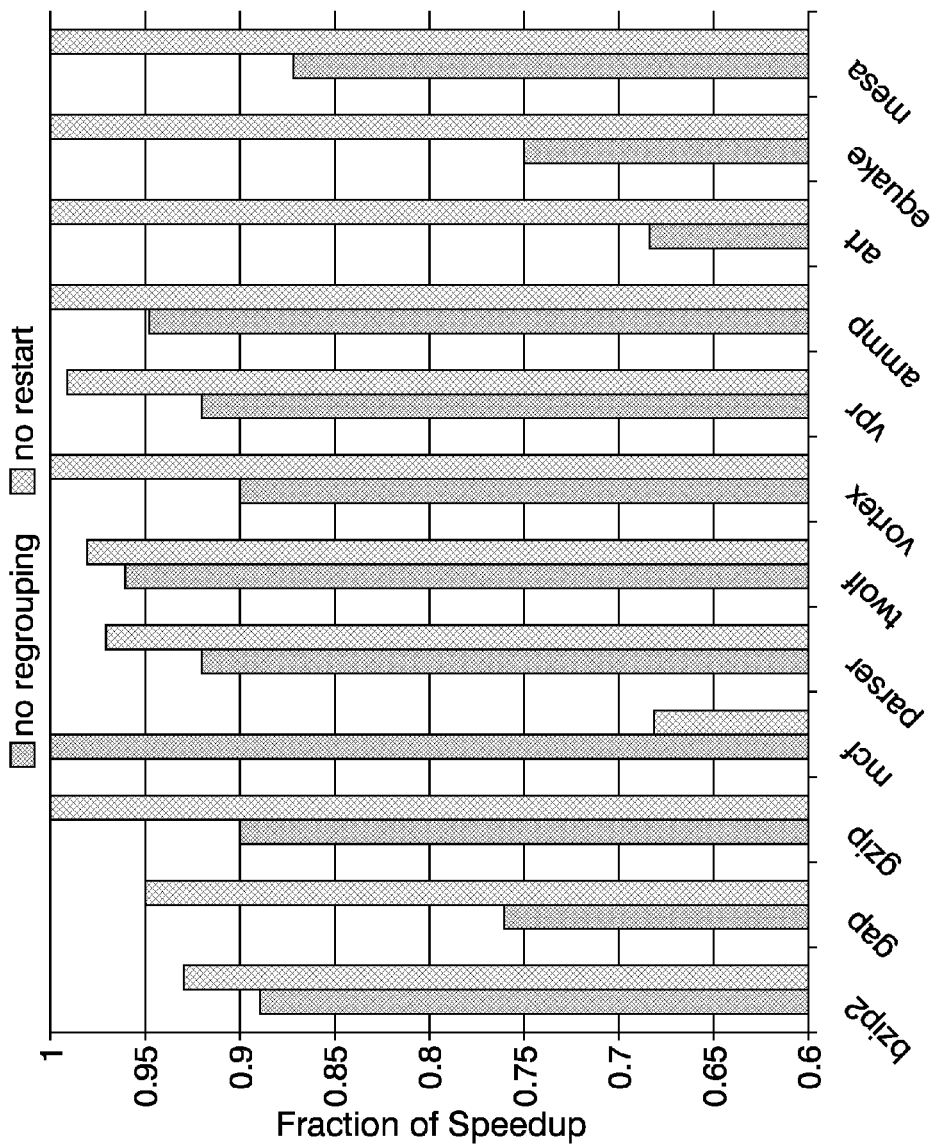
FIG. 8 depicts a comparative graph of relative speedups of multipass pipelining without instruction regrouping or advance restart.

FIG. 8 shows the percent of the full multipass speedup achieved without one or the other of the key elements of multipass pipelining, indicating that for all benchmarks except for mcf, instruction regrouping provides for the speedup of the multipass approach. Advance restart provides for the speedup of bzip2, gap, and mcf. These benchmarks both have fewer chained cache misses (in particular in the CFP2000 benchmarks) and fewer misses that comprise strongly-connected components used to drive the advance restart.

All patents, patent applications, and publications referenced in the present application are hereby incorporated by reference including, but not limited to: R. D. Barnes et al., "Flea Flicker" Multipass Pipelining: An Alternative to the High-Power Out-of-Order Offense, Proceedings of the 38th Annual IEEE/ACM International Symposium on Microarchitecture (November 2005); R. D. Barnes et al., Beating in-order stalls with "flea-flicker" two-pass pipelining, Proceedings of the 36th Annual International Symposium on Microarchitecture, pages 387-398, (November 2003); R. D. Barnes et al., Tolerating Cache-Miss Latency With Multipass Pipelines, IEEE Micro, pp. 40-47 (Published by IEEE Computer Society January 2006); and J. W. Sias et al. Field-testing IMPACT EPIC research results in Itanium 2, Proceedings of the 31th Annual International Symposium on Computer Architecture, pages 2637, (July 2004).

Many other embodiments of the present application are envisioned. For instance, it should be appreciated that other implementations may not include an in-order FIFO instruction queue and/or corresponding latches. Alternatively or additionally, other implementations could use a different approach to the SMAQ and ASC to establish proper instruction order. Likewise, alternative approaches could be used for instruction regrouping, or the instruction regrouping technique could be foregone altogether.

In another example, a method of the present application includes: encountering a stalled instruction during operation of a processor in a nominal execution mode, operating the processor in an advance execution mode in response to the stalled instruction, processing several instructions downstream of the stalled instruction during the advance execution mode, and repeating the processing of the several instructions one or more times during the advance execution mode. This embodiment may include saving valid results from the advance execution mode and merging these results during a transitional rallying mode of the processor as it returns to the nominal execution mode. Alternatively or additionally, regrouping of instructions is performed based on results from the advance execution mode. Further examples include a device, system, microarchitecture, and/or apparatus structured to perform this method.

Still another embodiment is directed to a method that includes: performing multiple processing passes through a sequence of instructions during operation of a processor in an advance execution mode and regrouping instructions based on the results. The advance execution mode may be triggered by a stalled instruction. The stalled instruction may result from a cache miss. Further embodiments include a device, system, microarchitecture, and/or apparatus structured to perform this method.

Yet another embodiment is directed to a method that includes: operating a processor in an advance execution mode in response to an instruction stall during operation of a processor in a normal execution mode, performing multiple processing passes through a sequence of instructions during the advance execution mode of operation, storing results from the multiple passes, and utilizing the results to reduce execution time for the sequence of instructions after halting the advance execution mode. Further embodiments include a device, system, microarchitecture, and/or apparatus structured to perform this method.

Another embodiment comprises: a processor triggering a first advance execution processing pass through an instruction sequence in response to a first instruction that stalls for a first amount of time, initiating execution of a second instruction in the instruction sequence that stalls a second amount of time during performance of the first advance execution processing pass, and performing a second advance execution processing pass through the instruction sequence in which the second instruction is processed after the second amount of time has lapsed, using a valid result from the second instruction to perform one or more other instructions in the instruction sequence during the second advance execution processing pass before the first amount of time has lapsed. In one form, the first instruction is performed while the processor operates in a normal execution mode, and the first and second advance execution processing passes are performed while the processor operates in an advance execution mode. Alternatively or additionally, the processor maintains valid results obtained from the first and second advance execution processing passes, and substitutes and/or regroups instructions based on those results.

In a further embodiment, a method of the present application comprises: executing a sequence of instructions with an integrated circuit processor in a first operating mode; encountering a cache miss that results in a stalled one of the instructions in the sequence during the first operating mode of the processor; in response to the stalled one of the instructions, switching from the first operating mode to a second operating mode of the processor, the second operating mode generating a valid result for each of one or more of the instructions after the stalled one of the instructions in the sequence, which includes: processing several instructions starting after the stalled one of the instructions over a first time period and restarting the processing of the several instructions over a second time period after the first time period; and bypassing execution of the one or more of the instructions by substituting the valid result during later execution. In further examples, a device, system, microarchitecture, and/or apparatus is arranged to perform this method.

Still a further example includes a processor with: means for determining a stalled instruction during operation in a nominal execution mode; means for operating in an advance execution mode in response to the stalled instruction; means for processing several instructions downstream of the stalled instruction during the advance execution mode; and means for repeating the processing of the several instructions one or more times during the advance execution mode.

Yet a further example comprises: switching operation of a processor from a general execution mode to an advance execution mode in response to a cache miss of an instruction during performance in the general execution mode; during the advance execution mode, performing multiple speculative execution passes through several instructions subsequent to the instruction causing the cache miss with the processor and storing results from one or more of the speculative execution passes; and returning to the general execution mode and applying the results to reduce execution time for the instructions.

In a another example, a method, includes: operating a processor in a general execution mode; with the processor, performing a first advance execution processing pass through a sequence of instructions in response to a stall of one of the instructions in the general execution mode for a first amount of time; during performance of the first advance execution processing pass, executing a subsequent one of the instructions in the sequence that stalls a second amount of time; performing a second advance execution processing pass through the sequence in which the subsequent one of the processor instructions is processed after the second amount of time has lapsed; and applying a valid result from the subsequent one of the processor instructions to perform one or more other of the processor instructions in the sequence during the second advance execution processing pass before the first amount of time has lapsed.

Still another example, includes processor instruction execution architecture including: an instruction processing pipeline with an instruction queue; a nominal register file coupled to the pipeline; a speculative execution register file couple to the pipeline; a cache; and operating logic to process instructions in the instruction queue with the pipeline. The operating logic is structured to switch from a nominal processing mode that accesses the nominal register file to a speculative processing mode that accesses the speculative execution register file in response to a cache miss by an instruction accessing the cache, and during the speculative processing mode to: perform a first speculative execution pass through a sequence of instructions, perform a second speculative execution pass through at least a portion of the sequence of instructions after the first speculative execution pass, and store results from the speculative processing mode. The operating logic being further structured to return to the nominal processing mode and use the results to decrease execution time for the sequence of instructions.

In still another example, a processor includes architecture structured to operate in a general execution mode and an advance execution mode, the architecture including: means for determining an instruction stall during operation of the processor in the general execution state; means for switching operation of the processor from the general execution state to the advance execution state in response to the instruction stall; means performing multiple speculative execution passes through several instructions during the advance execution mode; means for storing results from one or more of the speculative execution passes during the advance execution mode; means for returning to the general execution mode; and means for applying the results to reduce execution time for the instructions.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the inventions as defined herein are desired to be protected.

What is claimed is:

1. A method, comprising:
    switching operation of a processor from a general execution mode to an advance execution mode in response to a first cache miss of an instruction during performance in the general execution mode, the first cache miss resulting in a first stall lasting for a first amount of time;
    during the advance execution mode, performing multiple speculative execution passes through several instructions subsequent to the instruction causing the first cache miss with the processor, and storing results from one or more of the speculative execution passes;
    during performance of a first one of the speculative execution passes, executing a subsequent one of the instructions that causes a second cache miss resulting in a second stall that lasts a second amount of time;
    performing a second one of the speculative execution passes to process the subsequent one of the instructions after the second amount of time has lapsed;
    applying a subsequent one of the results from the subsequent one of the instructions to perform one or more other instructions during the speculative execution passes before the first amount of time has lapsed; and
    returning to the general execution mode and applying the results to reduce execution time for the several instructions subsequent to the instruction causing the first cache miss.

2. The method of claim 1, which includes merging the results; and
    after the merging, returning the processor to the general execution mode.

3. The method of claim 1, which includes the processor defining a pipeline instruction handling architecture including a general execution cache, an advance execution cache, a nominal register file, and a speculative register file.

4. The method of claim 1, which includes:
    maintaining memory access order during the advance execution mode with a speculative memory address queue; and
    instruction regrouping based on the results from the advance execution mode.

5. A method, comprising:
    operating a processor in a general execution mode;
    with the processor, performing a first advance execution processing pass through a sequence of instructions in response to a stall of one of the instructions in the general execution mode, the stall lasting for a first amount of time;
    during performance of the first advance execution processing pass, executing a subsequent one of the instructions in the sequence that stalls a second amount of time;
    performing a second advance execution processing pass through the sequence in which the subsequent one of the instructions is processed after the second amount of time has lapsed; and
    applying a valid result from the subsequent one of the instructions to perform one or more other instructions in the sequence during the second advance execution processing pass before the first amount of time has lapsed.

6. The method of claim 5, which includes the processor defining a pipeline instruction handling architecture including a first cache accessed during performance of the general execution mode and a second cache accessed during performance of the advance execution processing pass.

7. The method of claim 6, wherein the architecture defines a nominal execution register file and a speculative execution register file.

8. The method of claim 5, which includes:
performing the first pass and the second pass during an advance mode of execution of the processor;
performing processor instruction regrouping;
merging instruction results; and
returning to the general execution mode.

9. The method of claim 5, wherein the performing of the first pass and the second pass occurs while the processor operates in an advance execution mode and further comprising:
switching to a rallying mode of processor execution from the advance execution mode; and
returning to the general execution mode from the rallying mode.

10. An apparatus, comprising: processor instruction execution architecture including:
an instruction processing pipeline with an instruction buffer;
a nominal register file coupled to the pipeline;
a speculative execution register file coupled to the pipeline;
a cache; and
operating logic to process instructions in the instruction buffer with the pipeline, the operating logic being structured to switch from a nominal processing mode that accesses the nominal register file to a speculative processing mode that accesses the speculative execution register file in response to a first cache miss resulting in a first stall that lasts for a first amount of time by an instruction accessing the cache, and during the speculative processing mode to: perform a first speculative execution pass through a sequence of instructions including executing a subsequent one of the instructions in the sequence that results in a second cache miss resulting in a second stall that lasts a second amount of time, perform a second speculative execution pass through the sequence of instructions in which the subsequent one of the instructions in the sequence is processed after the second amount of time has lapsed, apply a subsequent result from the subsequent one of the instructions in the sequence to perform one or more other instructions in the sequence during the second speculative execution pass before the first amount of time has lapsed, and store results from the speculative processing mode, and the operating logic being further structured to return to the nominal processing mode and use the results to decrease execution time for the sequence of instructions.

11. The apparatus of claim 10, wherein the architecture includes:
a speculative mode cache, wherein the operating logic is structured to access the speculative mode cache during performance of the speculative processing mode; and
a speculative memory address queue to maintain memory access order.

12. The apparatus of claim 10, wherein the architecture includes means for redirecting access from the nominal register file to the speculative execution register file and means for instruction regrouping in accordance with the results.

13. The apparatus of claim 10, wherein the architecture includes a bit vector to mark one or more of the sequence instructions subject to the speculative processing mode.

14. The apparatus of claim 10, further comprising a computer with a processor including the architecture.

* * * * *